United States Patent
Hohmann et al.

(10) Patent No.: US 7,469,592 B2
(45) Date of Patent: Dec. 30, 2008

(54) HYDRAULIC THREADED BOLT CLAMPING DEVICE AND METHOD FOR TIGHTENING LARGE SCREWS BY MEANS OF SAID HYDRAULIC THREADED BOLT CLAMPING DEVICE

(76) Inventors: Jörg Hohmann, Uhlandstr. 6a, Meschede (DE) 59872; Frank Hohmann, Josef-Menke-Str. 25, Warstein (DE) 59851

( * ) Notice: Subject to any disclaimer, the term of this patent is extended or adjusted under 35 U.S.C. 154(b) by 0 days.

(21) Appl. No.: 11/910,675

(22) PCT Filed: Apr. 4, 2006

(86) PCT No.: PCT/EP2006/003050

§ 371 (c)(1), (2), (4) Date: Oct. 4, 2007

(87) PCT Pub. No.: WO2006/105931

PCT Pub. Date: Oct. 12, 2006

(65) Prior Publication Data

US 2008/0173140 A1    Jul. 24, 2008

(30) Foreign Application Priority Data

Apr. 6, 2005    (DE) .................. 10 2005 015 922

(51) Int. Cl.
*G01N 3/08* (2006.01)

(52) U.S. Cl. .............. 73/761; 73/826; 73/837; 73/840; 73/856; 73/857

(58) Field of Classification Search .......... 73/761, 73/826, 837, 856, 857; 81/54, 429
See application file for complete search history.

(56) References Cited

U.S. PATENT DOCUMENTS

| | | | |
|---|---|---|---|
| 4,047,456 A * | 9/1977 | Scholz | 81/57.38 |
| 4,333,351 A * | 6/1982 | Bickford | 73/761 |
| 4,685,050 A * | 8/1987 | Polzer et al. | 700/32 |
| 4,773,146 A | 9/1988 | Bunyan | |
| 5,257,207 A | 10/1993 | Warren | |

(Continued)

FOREIGN PATENT DOCUMENTS

DE    2846668 A1    6/1980

(Continued)

*Primary Examiner*—Edward Lefkowitz
*Assistant Examiner*—Freddie Kirkland, III
(74) *Attorney, Agent, or Firm*—Gudrun E. Huckett

(57) ABSTRACT

A hydraulic threaded bolt clamping device for tightening and releasing threaded bolts has a pressure medium supply connected to a pressure medium connector. A cylinder rests against a machine part that is to be clamped and a periodically pressure-loaded piston is guided seal-tightly in the cylinder and rests against a threaded bushing screwed onto the threaded bolt. A control device actuates the pressure medium supply for supplying pressure medium to the bolt clamping device. After a nominal value corresponding to a nominal prestressing force has been reached the pressure medium supply is switched off. The nominal screw prestressing force or a corresponding nominal pressure of the pressure medium supply is preset by an input device. A measuring device measures relative displacement of the threaded end of the bolt relative to the cylinder. An evaluation device determines residual actual screw prestress after pressure relief of the bolt clamping device.

14 Claims, 3 Drawing Sheets

U.S. PATENT DOCUMENTS

| | | | |
|---|---|---|---|
| 5,343,785 A * | 9/1994 | Holt et al. | 81/57.38 |
| 6,167,764 B1 * | 1/2001 | Calhoun | 73/837 |
| 7,062,998 B2 * | 6/2006 | Hohmann et al. | 81/429 |
| 2004/0261583 A1 | 12/2004 | Hohmann et al. | |
| 2008/0006122 A1 * | 1/2008 | Hohmann et al. | 81/57.38 |
| 2008/0034925 A1 * | 2/2008 | Hohmann et al. | 81/57.38 |

FOREIGN PATENT DOCUMENTS

| | | |
|---|---|---|
| DE | 19638901 A1 | 3/1998 |
| GB | 2267943 A1 | 12/1993 |
| WO | 2006/000677 A1 | 1/2006 |

* cited by examiner

HYDRAULIC THREADED BOLT CLAMPING DEVICE AND METHOD FOR TIGHTENING LARGE SCREWS BY MEANS OF SAID HYDRAULIC THREADED BOLT CLAMPING DEVICE

BACKGROUND OF THE INVENTION

The invention relates to a hydraulic threaded bolt clamping device for tightening and releasing large screws and a method for tightening such screws by means of the threaded bolt clamping device that comprises a pressure medium supply to the threaded bolt clamping device, a pressure medium connector on the threaded bolt clamping device, a cylinder resting against a machine part that is to be clamped by means of a threaded bolt and a nut, at least one periodically pressure-loaded piston that rests against a threaded bushing threaded onto a threaded end of the threaded bolt, and a control device for actuating the pressure medium supply to the threaded bolt clamping device.

In order to obtain precise information of the screw prestress, it is known to directly measure the achieved screw strain because the screw strain, as a result of Hook's law, is directly proportional to this screw prestress. This strain measurement can be realized in different ways.

According to DE 28 46 668 A1 the threaded bolt to be clamped can be provided with a through bore over its entire length and a measuring rod can be inserted into this bore; the length of the measuring rod should match essentially the length of the threaded bolt and the measuring rod does not participate in the strain of the threaded bolt so that the strain of the threaded bolt is determined by the length difference between the measuring rod and the threaded bolt.

This measuring method is complex because each threaded bolt must be provided with a through bore and the measuring rod must be inserted into the bore and connected to a suitable measuring device for each clamping action of the threaded bolt.

In a hydraulic threaded bolt clamping device disclosed in DE 101 45 847 of the same applicant, a measuring method is employed that resides in that the threaded bolt strain is to be determined based on measuring the rotation angle of the nut because, based on the respective pitch of the thread, there is a constant ratio between the rotation angle of the nut and the threaded bolt strain. In this measuring method, it is required to first tighten the nut to a point where all components to be clamped by the threaded bolt are positioned relative to one another without play and to take into account the rotation angle of the nut only from the thus determined joining point on.

The two known measuring methods enable the determination of the strain of the threaded bolt that is caused by pressurizing the hydraulic threaded bolt clamping device with satisfactory precision and enable an extensive automation of the tightening action of large screws, but they require an increased apparatus expenditure for this purpose.

SUMMARY OF THE INVENTION

It is an object of the invention to provide a hydraulic threaded bolt clamping device and a method for tightening large screws by means of such a hydraulic threaded bolt clamping device, which enable with minimal apparatus expenditure a precise determination of the residual strain of the threaded bolt after pressure relief of the threaded bolt clamping device without this requiring a direct measurement of the strain of the threaded bolt by means of a measuring rod or by means of the rotation angle of the nut.

Based on this object, a hydraulic threaded bolt clamping device of the aforementioned kind is proposed that comprises a control device for actuating the pressure medium supply to the threaded bolt clamping device and for switching off the pressure medium supply after reaching a nominal pressure that matches the nominal prestress; an input device for a nominal screw prestressing force; a measuring device for measuring the relative displacement of the threaded end of the threaded bolt relative to the cylinder; and an evaluation device for determining the residual screw prestress after pressure relief of the threaded bolt clamping device.

The invention is based on the idea that the nominal screw prestressing force and the resulting screw strain can be calculated in a simple way based on the size of the screw and based on known laws. This nominal screw prestressing force can be applied by means of the hydraulic threaded bolt clamping device wherein the screw prestressing force is identical to the hydraulic pressure of the pressure medium supply multiplied by the piston surface area of the hydraulic threaded bolt clamping device. In this connection, it is not necessary to know the screw strain. However, it is very important to know the residual actual screw prestress after tightening the respective nut after pressure relief of the threaded bolt clamping device because settling will take place after pressure relief of the threaded bolt clamping device. In order to be able to know the residual actual screw prestress, it is sufficient to measure the strain difference between the state in which the hydraulic threaded bolt clamping device is loaded with nominal pressure and the state after tightening the screw and pressure relief of the threaded bolt clamping device. The measured differences can be converted by calculation based on Hook's law directly into a screw prestress difference and the residual actual screw prestress is then equal to the value of the screw prestress when pressure loading the threaded bolt clamping device with the nominal value minus said difference.

The strain measuring device therefore only must measure the displacement of the threaded end of the threaded bolt relative to the cylinder of the threaded bolt clamping device for which purpose no threaded bolt with through bore is required. It is instead sufficient to measure by means of the measuring device the position of the threaded end of the threaded bolt when the nominal pressure is reached and after pressure relief of the threaded bolt clamping device and tightening of the nut; this is possible without any special apparatus expenditure and requires no changes on a commonly used threaded bolt.

For determining whether the determined residual actual screw prestress corresponds to a residual nominal screw prestress, the evaluation device and an input device for a residual nominal screw prestress can be connected to the control device and a comparison device for comparing the determined residual actual screw prestress with a residual nominal screw prestress wherein the evaluation device preferably has a control signal device for actuating the pressure medium supply to the threaded bolt clamping device by means of the control device for a renewed pressure loading of the threaded bolt clamping device with an increased nominal pressure, should the determined residual actual screw prestress be below a preset nominal value.

By this measure, the screw clamping process can be completely automated without this requiring an action by the operator.

The measuring device can be comprised of a measuring rod that extends through a bore in the threaded bushing and a travel sensor that interacts with the measuring rod, wherein either the measuring rod rests with a first end on the threaded end of the threaded bolt and with a second end is slidably guided in a holder connected to the cylinder end and interacts with a travel sensor arranged on the holder; or the measuring rod is connected non-slidably with the first end to the holder fastened to the cylinder and the second end is guided in the vicinity of the threaded end of the threaded bolt wherein the travel sensor is arranged at the this end of the measuring rod adjacent to the threaded end of the threaded bolt.

For solving the aforementioned object, also a method for clamping large screws by means of the afore described hydraulic threaded bolt clamping device is proposed with the steps of:

a) inputting a nominal screw prestressing force in accordance with a nominal pressure of a pressure medium supply to the threaded bolt clamping device, or
b) inputting a nominal pressure of a pressure medium supply to the threaded bolt clamping device in accordance with a nominal screw prestressing forces,
c) switching on the pressure load of the threaded bolt clamping device and clamping the threaded bolt up to the nominal screw prestressing force,
d) switching off the pressure load of the threaded bolt clamping device when the nominal screw prestressing force is reached,
e) tightening the nut until the nut contacts the machine part to be clamped, either during the step c) or after the step d),
f) measuring the relative displacement of the threaded bolt end relative to the cylinder of the threaded bolt clamping device,
g) relieving the pressure load of the threaded bolt clamping device,
h) measuring again the relative displacement of the threaded bolt end relative to the cylinder of the threaded bolt clamping device,
i) determining the residual actual screw prestress based on the measurements according to the steps f) and h).

The operator can compare the thus determined screw prestress with a nominal screw prestress when both values are shown on a display field of the control device for the threaded bolt clamping device. When the residual actual screw prestress is smaller by a preset amount than the preset residual nominal screw prestress, the operator can again switch on the pressure load of the hydraulic threaded bolt clamping device and increase in this connection the nominal pressure of the pressure medium supply proportionally to the difference between the residual actual screw prestress and the preset residual nominal screw prestress. However, this nominal pressure should always be so small that the strain on the threaded bolt will not surpass its elasticity limit.

The afore defined method can be performed in different ways with additional steps. According to a first variant, the method comprises the additional or alternative steps:

1.1) inputting the cross-sectional surface area and the clamping length of the threaded bolt and calculating the nominal screw prestressing force and, based thereon, the nominal pressure;
1.2) continuing with the aforementioned steps c) to e) and the alternative steps:
1.3) setting the measuring device to zero,
1.4) continuing with the aforementioned step g) and the alternative steps:
1.5) measuring the difference of displacement between the state after step e) and the state after step g),
1.6) calculating and displaying the residual actual screw prestress in accordance with the formula $F = P \times A_k - \Delta l \times E \times A/L$.
E=module of elasticity of the threaded bolt [N/mm²]
A=cross-sectional surface area of the threaded bolt [mm²]
L=clamping length of the threaded bolt [mm]
$\Delta l$=length difference between the state after step e) and the state after step g) [mm]
wherein
p=pressure acting within the threaded bolt clamping device [MPa]
$A_k$=piston surface area of the threaded bolt clamping device [mm²]

In this method, only the strain difference $\Delta l$ is measured in that the measuring device is set to zero when the nominal pressure is reached. Based on the entered screw dimensions and the clamping length, it is then possible in a simple way to calculate the residual actual screw prestress because it is only necessary to subtract from the screw prestress, resulting from the pressure and the piston surface area of the threaded bolt clamping device, the prestress loss resulting from the strain difference.

While the cross-sectional surface area of a threaded bolt to be clamped by the device according to the invention and by the method according to the invention is generally known, the clamping length is however often not known. The clamping length can be eliminated from the measurement when the following method steps according to a second variant are performed additionally or alternatively:

2.1) beginning with the aforementioned step a) or b)
2.2) switching on the pressure load of the threaded bolt clamping device and clamping the threaded bolt to a pressure of approximately 1.5% to 3% of the nominal pressure,
2.3) setting the measuring device to zero,
2.4) increasing the pressure load of the threaded bolt clamping device and clamping the threaded bolt to the nominal screw prestressing force,
2.5) continuing with the aforementioned steps d) to h),
2.6) calculating and displaying the residual actual screw prestress in accordance with the formula:

$$F = \frac{L_1}{L_2} \times p \times A_k$$

wherein $L_1$=threaded bolt strain in accordance with step h) [mm]
$L_2$=threaded bolt strain in accordance with step f) [mm]
$A_k$=piston surface area of the threaded bolt clamping device [mm²]
p=pressure acting within the threaded bolt clamping device [MPa]

Since in $L_1$ and $L_2$ the strain of the threaded bolt in accordance with step 2.2) is contained as the summand, respectively, in this way the length changes as a result of settling until the joining point is reached are eliminated with sufficient precision so that in this way the residual actual screw prestress can be calculated without this requiring the clamping length to be known.

The precision of determination of the residual actual screw prestress can be increased even more when the method is performed with the following alternative steps in accordance with a third variant:

3.1) beginning with the aforementioned step a) or b),
3.2) switching on the pressure load of the threaded bolt clamping device and clamping the threaded bolt to a pressure of approximately 4% to 15% of the nominal pressure.
3.3) setting the measuring device to zero;

3.4) increasing the pressure load of the threaded bolt clamping device and clamping the threaded bolt to the nominal screw prestressing force, 3.5) continuing with the aforementioned steps d) to h), 3.6) switching on again the pressure load of the threaded bolt clamping device and clamping the threaded bolt again to the pressure of approximately 4% to 15% of the nominal pressure;

3.7) measuring again the relative displacement of the threaded bolt end relative to the cylinder of the threaded bolt clamping device;

3.8) calculating and displaying the residual actual screw prestress according to the formula:

$$F = \frac{L_1 + \Delta L_1}{L_2} \times p \times A_k$$

wherein $L_1$=threaded bolt strain in accordance with step h) [mm]

$L_2$=threaded bolt strain in accordance with step f) [mm]

$\Delta L_1$=difference between the threaded bolt strain in accordance with step 3.7 and the threaded bolt strain in accordance with h) [mm]

$A_k$=piston surface area of the threaded bolt clamping device [mm²]

p=pressure medium supply acting within the threaded bolt clamping device [MPa]

In this modification of the method according to the invention, by means of the step 3.6), in the calculation of the residual actual screw prestress according to step 3.8) the strain until the joining point is reached, including settling, is completely eliminated without this requiring the clamping length to be known.

The method according to the invention can be completely automated with the following additional steps:

j) inputting into the control device or calculating by means of the control device a nominal screw prestress that is increased proportionally to the difference between the determined actual screw prestress that is too low and the preset residual nominal screw prestress, k) switching on again the pressure load of the threaded bolt clamping device and clamping the threaded bolt up to the increased nominal screw prestress, and l) repeating the steps d) to i).

The modified method according to the first variant can be automated by means of the additional steps of:

1.7) inputting into the control device or calculating by means of the control device a nominal screw prestress that is increased proportionally to the difference between the determined screw prestress that is too low and a preset residual nominal screw prestress, 1.8) switching on again the pressure load of the threaded bolt clamping device and clamping the threaded bolt up to the increased nominal screw prestress, 1.9) repeating the steps c), d), e) 1.3), 1.4), 1.5), 1.6).

The second modified variant can be automated when the additional steps 1.7), 1.8), as before and 2.7)—repeating the steps 2.2), 2.3), 2.4), 2.5), 2.6)—are performed.

Finally, the third modified variant can also be automated when the additional steps 1.7) and 1.8) as before and then 3.9)—repeating the steps 3.2), 3.3), 3.4), 3.5), 3.6), 3.7), 3.8)

are performed.

BRIEF DESCRIPTION OF THE DRAWINGS

The invention will be explained in more detail in the following with the aid of two embodiments illustrated in the drawing. The drawing shows in.

DESCRIPTION OF PREFERRED EMBODIMENTS

Figure 1:
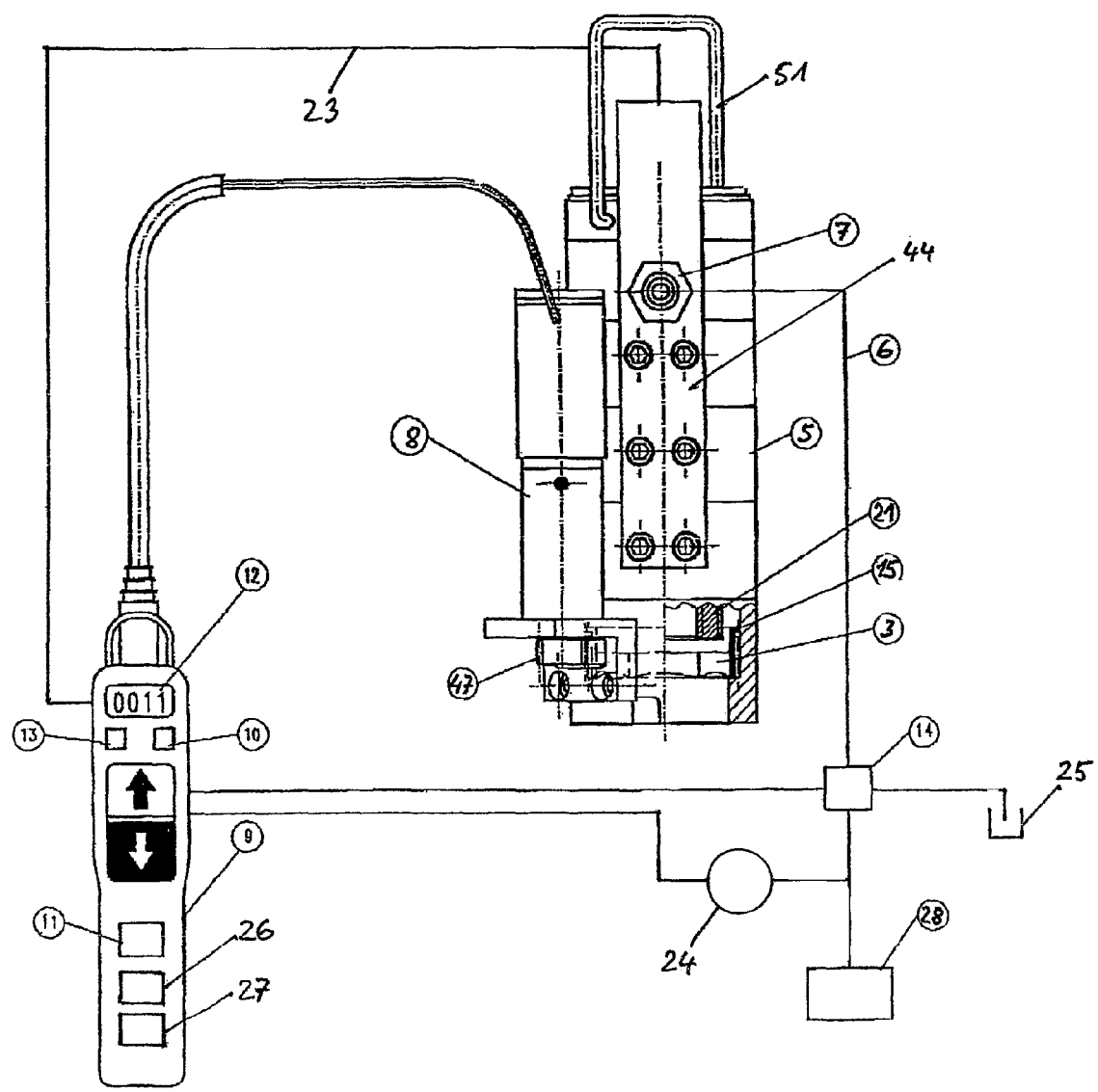
FIG. 1 a schematic illustration of a hydraulic threaded bolt clamping device in accordance with the invention with control device and hydraulic medium source.

The hydraulic threaded bolt clamping device illustrated in the drawings corresponds, with the exception of the measuring device, essentially to DE 196 38 901 A1 of the same applicant.

A machine part 1, that can be, for example, a flange of a machine housing, is to be clamped by means of a threaded bolt 2 and a nut 3 threaded thereon. In order to apply to the threaded bolt 2 a precisely controllable prestress and in order to keep away torsion moments from the threaded bolt 2 that represent an additional stress on the threaded bolt 2, the nut 3 is first only manually screwed onto the threaded bolt 2 until it contacts the machine part 1. The length of the threaded bolt 2 is selected such that a free threaded end 4 projects past the nut 3.

For clamping the threaded bolt 2, the threaded bolt clamping device is placed onto the nut 3 that is screwed onto the threaded bolt 2 wherein a rotary sleeve 15 provided with an inner hexagon positively engages the nut 3. A threaded bushing 21 that is connected to a clamping piston 31 in the cylinder 5 of the threaded bolt clamping device is screwed onto the projecting threaded end 4 of the threaded bolt 2; now the threaded bolt clamping device is operative. A hydraulic pump 28 is connected by means of an electric directional control valve 14, a pressure medium supply 6, and a pressure medium connector 7 to the threaded bolt clamping device and makes it possible to actuate pressure loading of the pressure medium supply 6 or a pressure relief to a reservoir 25. The rotary sleeve 15 is provided with an outer toothing engaged by a gear wheel of a gear 47. The gear 47 is connected to a rotary drive 8 that engages an inner square socket 49 of the gear 47. A control device 9 is connected to the rotary drive 8 and the electric directional control valve 14. A pressure gauge 24 that measures the pressure supplied by means of the hydraulic pump 28 to the pressure medium supply 6 is also connected to the control device 9.

The control device 9 has an input device 10 for the nominal prestress of the threaded bolt 2 or for the nominal pressure of the hydraulic pump 28 that results therefrom and from the surface area of the piston 31, as well as an input device 13 for the residual nominal prestress of the threaded bolt. By means of a display field 12 the input values and the measured values can be displayed.

The control device 9 comprises a computer 11, a comparison device 26 for comparing the determined residual actual screw prestress with the residual nominal screw prestress and a control signal device 27 for actuating the pressure medium supply 6 to the threaded bolt clamping device via the electric directional control valve 14.

Figure 2:
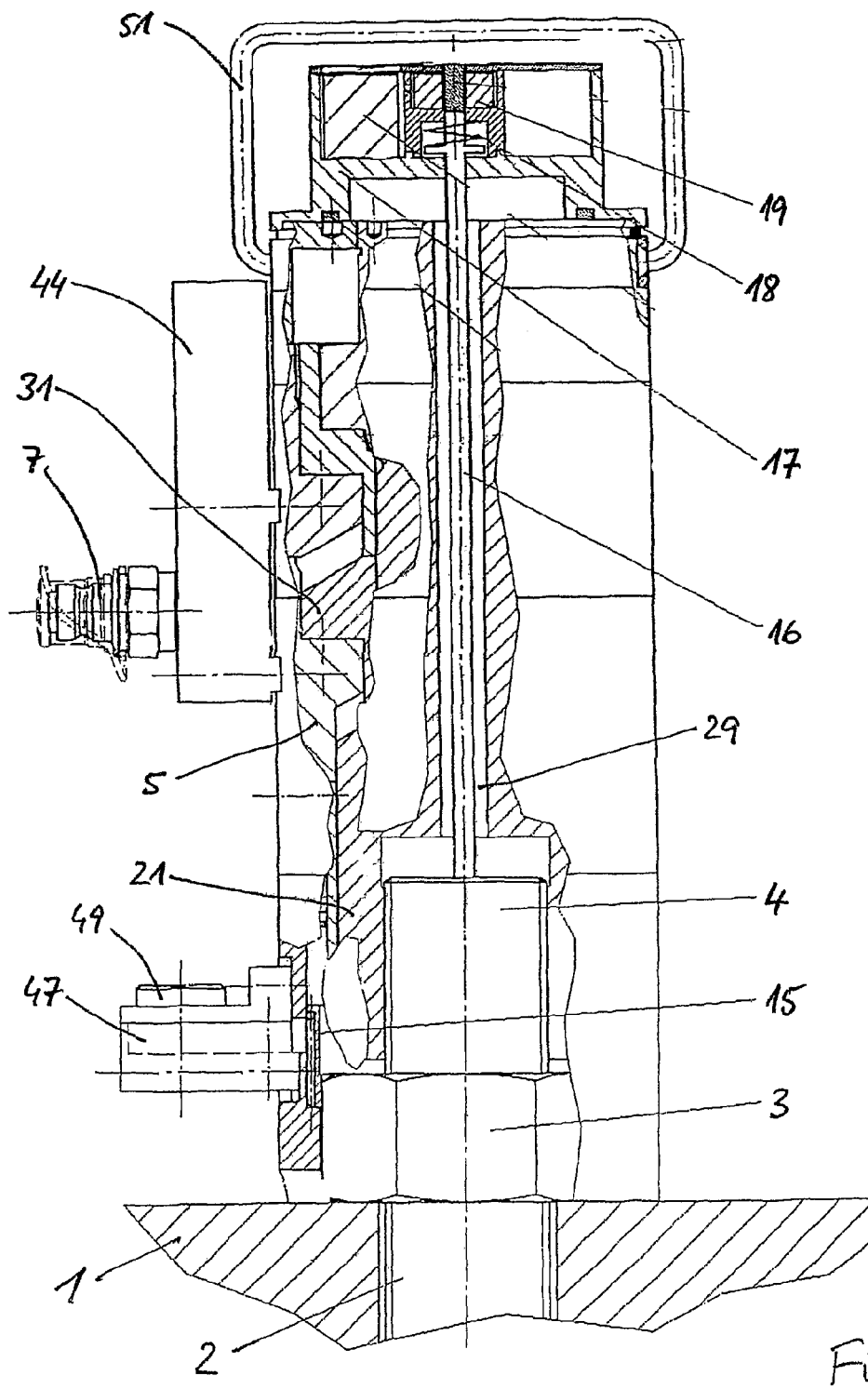
FIG. 2 a schematic section view of a hydraulic threaded bolt clamping device with a measuring device according to a first embodiment.

In the embodiment according to FIG. 2, in a central bore 29 of the threaded bushing 21 a measuring rod 16 is arranged and rests against the threaded end 4 of the threaded bolt 2. The opposite end of the measuring rod 16 is attached to a holder 17 that is connected to the end of the cylinder 5, is slidably arranged therein and is forced by means of pressure spring 18 against the threaded end 4 of the threaded bolt 2. A travel sensor 19 that can operate inductively, capacitively, optically or mechanically, interacts with the measuring rod 16.

Figure 3:
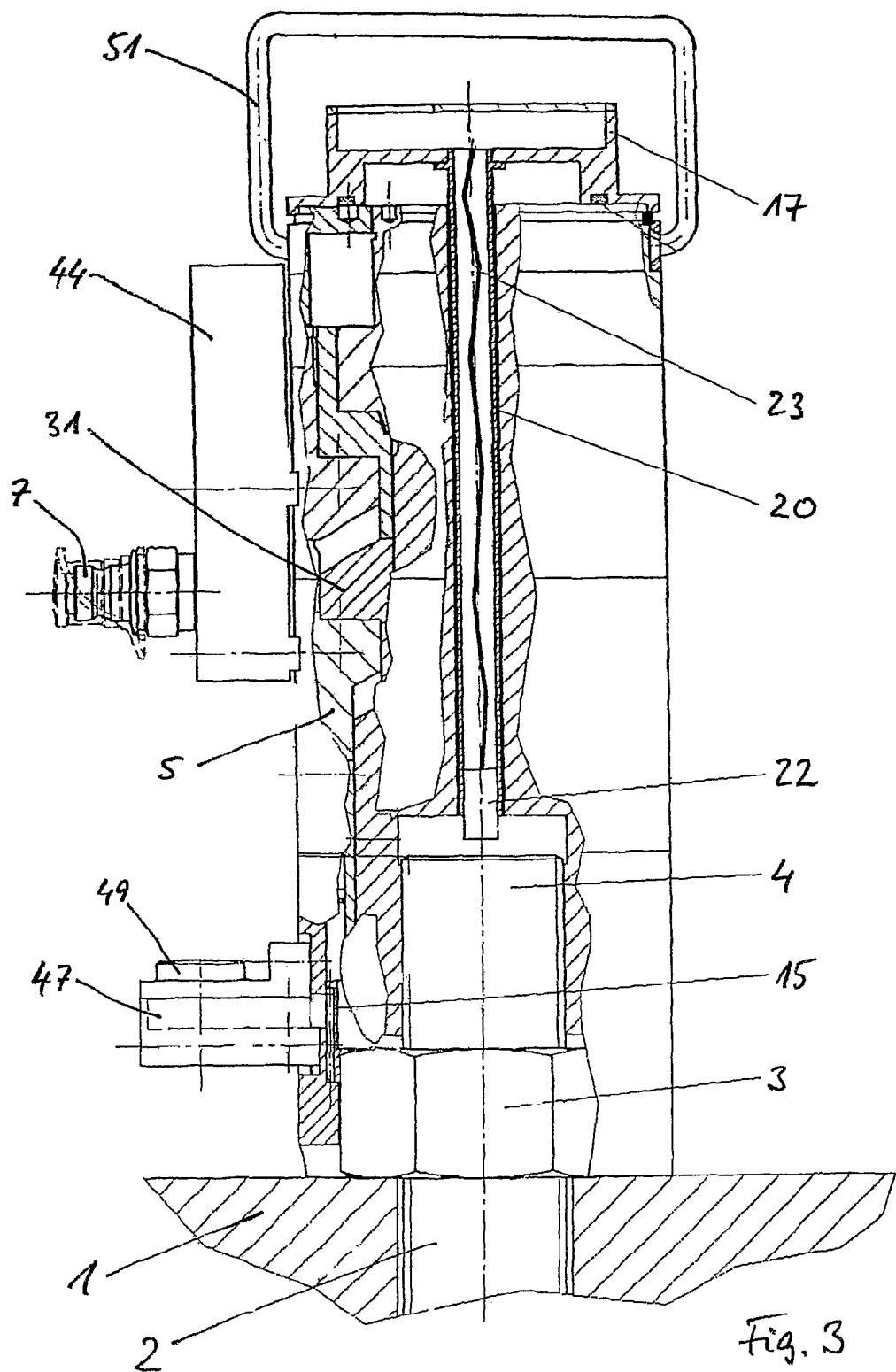
FIG. 3 a schematic section view of a hydraulic threaded bolt clamping device with a measuring device according to a second embodiment.

The embodiment according to FIG. 3 differs from the embodiment according to FIG. 2 only in that a travel sensor 22 is arranged adjacent to the threaded end 4 of the threaded bolt 2 on a measuring rod that is embodied as a securing tube 20 and is guided through the axial through bore 29 in the cylinder 5. The end opposite the travel sensor 22 is non-slidably connected to a holder 17 and this holder 17 is attached to the end of the cylinder 5. A measuring cable 23 is connected to the control device 9.

The threaded bolt clamping device can be gripped by means of a folding handle 51 and, in the case of a particularly large size, can be hooked to a crane hook.

For clamping the threaded bolt 2, the threaded bolt clamping device is placed in the described way onto the threaded bolt 2 provided with the nut 3 and screwed on until it contacts the support surface; into the input device 10 the cross-sectional surface area of the threaded bolt 2 and the clamping length as well as the nominal screw prestressing force or a corresponding nominal pressure of the hydraulic pump 28 are entered and into the input device 13 a residual nominal screw prestressing force is input. The hydraulic pressure generated by the hydraulic pump 28 of more than 1,000 MPa is conveyed through the pressure gauge 24 to the control device 9. The computer 11 communicates with the control device 9 and determines the commands for controlling the clamping action of the threaded bolt 2. When the adjusted nominal screw prestressing force is reached, the directional control valve 14 is closed and the nut 3 is tightened by means of the rotary drive 8 connected to the control device 9 so that, as a result of the applied torque, a minimal additional strain of the threaded bolt 2 is generated. Subsequently, the relative displacement of the threaded end 4 of the threaded bolt 2 relative to the cylinder 5 measured by the travel sensors 19, 22 is set to zero and, subsequently, pressure relief of the threaded bolt clamping device is realized by actuating the electric directional control valve 14 that releases the connection to the reservoir 25. As a result of this pressure relief, minimal settling between the machine part 1, the threaded bolt 2, and the nut 3 will occur, this settling leads to a displacement of the measuring rod 16 measured by the travel sensor 19 or it is proportional to the distance change of the travel sensor 22 relative to the threaded end 4. Accordingly, the actual screw prestress is smaller in accordance with this travel than the screw prestress effected by the nominal pressure of the hydraulic pump 28. The residual actual screw prestress can be calculated in accordance with the formula $$F = p \times A_k - \Delta l \times E \times A / L.$$

wherein p=pressure acting in the threaded bolt clamping device [MPa]

$A_k$=piston surface area of the threaded bolt clamping device [mm²]

Δl=length difference [mm]

E=module of elasticity of the threaded bolt [N/mm²]

A=cross-sectional surface area of the threaded bolt [mm²]

L=clamping length of the threaded bolt [mm]

Of these parameters, p and Δl are measured and $A_k$, E, A and L are input into the control device in a suitable form.

When the residual actual screw prestress is below a preset residual nominal screw prestress, the threaded bolt clamping device can be again loaded with a somewhat increased nominal pressure so that the nut 3 is again tightened and then a pressure relief of the threaded bolt clamping device with simultaneous measurement of settling is carted out.

The residual actual screw prestress can be determined also based only on measurement without knowing the clamping length of the threaded bolt when the threaded bolt 2 is tightened first by means of the threaded bolt clamping device by switching on the pressure load to a pre-pressure of approximately 1.5% to 3% of the nominal pressure, the measuring device 16, 19, 20, 22 is set to zero, subsequently the pressure load of the threaded bolt clamping device is increased up to the nominal screw prestressing force, the nut 3 is tightened until it contacts the machine part 1 to be clamped during pressure loading of the threaded bolt clamping device or after switching off the pressure load, and the relative displacement of the threaded bolt end 4 relative to the cylinder 5 of the threaded bolt clamping device is measured. When the threaded bolt clamping device is then relieved and the relative displacement of the threaded bolt end 4 relative to the cylinder 5 of the threaded bolt clamping device is measured again, the actual screw prestress can be calculated in accordance with the formula:

$$F = \frac{L_1}{L_2} \times p \times A_k$$

wherein $L_1$=threaded bolt strain after relief of pressure load of the threaded bolt clamping device [mm]

$L_2$=threaded bolt strain during pressure loading of the threaded bolt clamping device with the nominal pressure [mm]

$A_k$=piston surface area of the threaded bolt clamping device [mm²]

p=pressure of the pressure medium supply [MPa].

In this case, the minimal strain and settling to the joining point enter as a summand into $L_1$ as well as $L_2$ in accordance with the first applied pressure of 1.5% to 3% of the nominal pressure without the joining point having to be precisely determined.

An increase of the precision with complete elimination of the errors caused by the initial settling can be achieved when the pressure loading of the threaded bolt clamping device and tightening of the threaded bolt 2 is realized first at a pre-pressure of approximately 4% to 15% of the nominal pressure. Based on experience, at this pre-pressure the joining point is always surpassed. Upon reaching this pre-pressure, the measuring device 16, 19, 20, 22 is set to zero whereafter the pressure loading of the threaded bolt clamping device is increased to the nominal pressure and the threaded bolt 2 is tightened to the nominal screw clamping force. The threaded bolt strain is now measured as length $L_2$ while maintaining the pressure loading and after tightening the nut 3, and pressure loading of the threaded bolt clamping device is relieved. Now the threaded bolt strain $L_1$ is measured whereafter pressure loading of the threaded bolt clamping device is switched on again and clamping of the threaded bolt 2 to the same pre-pressure of approximately 4% to 15% of the nominal pressure is realized again. The relative displacement of the threaded bolt end 4 relative to the cylinder 5 of the threaded bolt clamping device is measured again; now all data for calculating the residual actual screw prestress are available. This calculation is done in accordance with the formula $$F = \frac{L_1 + \Delta L_1}{L_2} \times p \times A_k$$

wherein $L_1$=threaded bolt strain after pressure relief of the threaded bolt clamping device [mm]

$\Delta L_1$=difference between the threaded bolt strain $L_1$ and the threaded bolt strain when loaded with the pre-pressure of approximately 4% to 15% of the nominal pressure [mm]

$L_2$=threaded bolt strain during pressure loading of the threaded bolt clamping device with the nominal pressure [mm]

$A_k$=piston surface area of the threaded bolt damping device [mm²]

p=pressure of the pressure medium supply [MPa]

These steps can be automated completely when into the control device a corresponding value is input or calculated by the computer, wherein as a top limit the tensile strength of the threaded bolt with the respective thread size and the maximum screw prestress resulting therefrom must be preset always.

By means of the hydraulic threaded bolt clamping device according to the invention and the measuring method that can be performed therewith, the residual actual screw prestress can be adjusted precisely.

What is claimed is:

1. A hydraulic threaded bolt clamping device for tightening and releasing large screws, the clamping device comprising
    a pressure medium connector;
    a pressure medium supply connected to the pressure medium connector;
    a cylinder resting against a machine part that is to be clamped by a threaded bolt and a nut;
    at least one piston periodically pressure-loaded by the pressure medium supply and guided seal-tightly in the cylinder, the at least one piston resting against a threaded bushing screwed onto a threaded end of the threaded bolt;
    a control device for actuating the pressure medium supply for supplying pressure medium to the threaded bolt clamping device and for switching off the pressure medium supply after a nominal value that corresponds to a nominal screw prestressing force has been reached;
    a first input device for setting the nominal screw prestressing force or a corresponding nominal pressure of the pressure medium supply;
    a measuring device for measuring a relative displacement of the threaded end of the threaded bolt relative to the cylinder; and
    an evaluation device for determining a residual actual screw prestress after pressure relief of the threaded bolt clamping device.

2. The threaded bolt clamping device according to claim 1, further comprising a second input device for setting a residual nominal screw prestressing force wherein the evaluation device and the second input device are connected to the control device wherein the control device comprises a comparison device that compares the determined residual actual screw prestress with a residual nominal screw prestress.

3. The threaded bolt clamping device according to claim 2, wherein, if the residual actual screw prestress is below the preset residual nominal screw prestress, the evaluation device acts on a control signal device for actuating the pressure medium supply through the control device for pressure loading the threaded bolt clamping device with an increased nominal pressure.

4. The threaded bolt clamping device according to claim 1, wherein the measuring device is comprised of a measuring rod extending through a bore in the threaded bushing and is further comprised of a travel sensor interacting with the measuring rod.

5. The threaded bolt clamping device according to claim 4, wherein the measuring rod has a first end resting against the threaded end of the threaded bolt and a second end that is slidably guided in a holder attached to an end of the cylinder and that interacts with the travel sensor arranged on the holder.

6. The threaded bolt clamping device according to claim 4, wherein the measuring rod has a first end secured non-slidably to a holder attached to an end of the cylinder and has a second end that extends to the threaded end of the threaded bolt, wherein the travel sensor is arranged at the second end of the measuring rod.

7. A method for tightening large screws with a hydraulic threaded bolt clamping device according to claim 1, the method comprising the steps of:
    a) inputting a nominal screw prestressing force in accordance with a nominal pressure of a pressure medium supplied to the threaded bolt clamping device, or
    b) inputting a nominal pressure of a pressure medium supplied to the threaded bolt clamping device matching the nominal screw prestressing force,
    c) switching on a pressure loading action of the threaded bolt clamping device and clamping a threaded bolt to the nominal screw prestressing force,
    d) switching off the pressure loading action when the nominal screw prestressing force is reached,
    e) during the step c) or after the step d), tightening a nut on the threaded bolt until the nut contacts a machine part to be clamped by the threaded bolt and the nut,
    f) measuring a relative displacement of a threaded bolt end of the threaded bolt relative to a cylinder of the threaded bolt clamping device,
    g) relieving a pressure load of the pressure loading action of the threaded bolt clamping device,
    h) measuring again the relative displacement of the threaded bolt end relative to the cylinder of the threaded bolt clamping device,
    i) determining the residual actual screw prestress based on the measurements of the steps f) and h).

8. The method according to claim 7, further comprising the steps of:
    1.1) inputting a cross-sectional surface area and a clamping length of the threaded bolt;
    1.2) continuing with the steps c) to e) and the alternative steps:
    1.3) setting the measuring device to zero,
    1.4) continuing with step g) and he alternative steps of:
    1.5) measuring a difference of displacement between a state after step e) and a state after step g), 1.6) calculating and displaying the residual actual screw prestress in accordance with the formula $F=p \times A_k - \Delta l \times E \times A/L$.

wherein p=pressure acting within the threaded bolt clamping device [MPa]

$A_k$=piston surface area of the threaded bolt clamping device [mm$^2$]

Δl=length difference according to step 1.5) [mm]

E=module of elasticity of the threaded bolt [N/mm$^2$]

A=cross-sectional surface area of the threaded bolt [mm$^2$]

L=clamping length of the threaded bolt [mm].

9. The method according to claim 8, further comprising the steps of:

1.7) inputting into the control device or calculating with the control device a nominal screw prestress that is increased proportionally to the difference between a determined residual screw prestress that is too low and a preset residual nominal screw prestress, 1.8) switching on again the pressure loading action of the threaded bolt clamping device and clamping the threaded bolt up to the increased nominal screw prestress;

1.9) repeating the steps c), d), e), 1.3), 1.4), 1.5), 1.6).

10. The method according to claim 7, further comprising the steps:

2.1) beginning with the step a) or the step b)

2.2) switching on the pressure loading action of the threaded bolt clamping device and clamping the threaded bolt up to a pressure of approximately 1.5% to 3% of the nominal pressure, 2.3) setting the measuring device to zero, 2.4) increasing a pressure load of the threaded bolt clamping device by the pressure loading action and clamping the threaded bolt up to the nominal screw prestressing force, 2.5) continuing with the steps d) to h), 2.6) calculating and displaying the residual actual screw prestress in accordance with the formula:

$$F = \frac{L_1}{L_2} \times p \times A_k$$

wherein $L_1$=threaded bolt strain in accordance with step h) [mm]

$L_2$=threaded bolt strain in accordance with step f) [mm]

$A_k$=piston surface area of the threaded bolt clamping device [mm$^2$]

p=pressure of the pressure medium supply [MPa].

11. The method according to claim 10, further comprising the steps of:

1.7) inputting into the control device or calculating with the control device a nominal screw prestress that is increased proportionally to the difference between a determined residual screw prestress that is too low and a preset residual nominal screw prestress, 1.8) switching on again the pressure loading action of the threaded bolt clamping device and clamping the threaded bolt up to the increased nominal screw prestress;

2.7) repeating the steps 2.2), 2.3), 2.4), 2.5), 2.6).

12. The method according to claim 7, further comprising the steps of:

3.1) beginning with the step a) or the step b), 3.2) switching on the pressure loading action of the threaded bolt clamping device and clamping the threaded bolt up to a pressure of approximately 4% to 15% of the nominal pressure:

3.3) setting the measuring device to zero;

3.4) increasing a pressure load of the threaded bolt clamping device by the pressure loading action and clamping the threaded bolt up to the nominal screw prestressing force;

3.5) continuing with the steps d) to h), 3.6) switching on again the pressure loading action of the threaded bolt clamping device and clamping the threaded bolt again to the pressure of approximately 4% to 15% of the nominal pressure;

3.7) measuring again the relative displacement of the threaded bolt end relative to the cylinder of the threaded bolt clamping device;

3.8) calculating and displaying the residual actual screw prestress according to the formula:

$$F = \frac{L_1 + \Delta L_1}{L_2} \times p \times A_k$$

wherein $L_1$=threaded bolt strain in accordance with step h) [mm]

$\Delta L_1$=difference between the threaded bolt strain in accordance with the step 3.7) and the threaded bolt strain in accordance with h) [mm]

$L_2$=threaded bolt strain in accordance with step f) [mm]

$A_k$=piston surface area of the threaded bolt clamping device [mm$^2$]

p=pressure of the pressure medium supply [MPa].

13. The method according to claim 12, further comprising the steps of:

1.7) inputting into the control device or calculating with the control device a nominal screw prestress that is increased proportionally to the difference between the determined residual screw prestress hat is too low and a preset residual nominal screw prestress, 1.8) switching on again the pressure loading action of the threaded bolt clamping device and clamping the threaded bolt up to the increased nominal screw prestress;

3.9) repeating the steps 3.2), 3.3), 3.4). 3.5), 3.6), 3.8).

14. The method according to claim 7, further comprising the steps of:

j) inputting into the control device or calculating with the control device a nominal screw prestress that is increased proportionally to a difference between a determined residual screw prestress that is too low and a preset residual nominal screw prestress, k) switching on again the pressure loading action of the threaded bolt clamping device and clamping the threaded bolt up to the increased nominal screw prestress; and l) repeating the steps d) to i).

* * * * *